(12) United States Patent
Lee et al.

(10) Patent No.: US 11,987,733 B2
(45) Date of Patent: May 21, 2024

(54) ACRYLIC ADHESIVE COMPOSITION, POLARIZING PLATE, AND DISPLAY DEVICE

(71) Applicant: LG Chem, Ltd., Seoul (KR)

(72) Inventors: Min Ki Lee, Daejeon (KR); Kee Young Kim, Daejeon (KR); Dong Jo Ryu, Daejeon (KR)

(73) Assignee: LG Chem, Ltd., Seoul (KR)

( * ) Notice: Subject to any disclaimer, the term of this patent is extended or adjusted under 35 U.S.C. 154(b) by 486 days.

(21) Appl. No.: 17/438,704

(22) PCT Filed: Sep. 24, 2020

(86) PCT No.: PCT/KR2020/012969
§ 371 (c)(1),
(2) Date: Sep. 13, 2021

(87) PCT Pub. No.: WO2021/060876
PCT Pub. Date: Apr. 1, 2021

(65) Prior Publication Data
US 2022/0154042 A1 May 19, 2022

(30) Foreign Application Priority Data

Sep. 27, 2019 (KR) .................. 10-2019-0120028

(51) Int. Cl.
| | | |
|---|---|---|
| C09J 4/06 | (2006.01) | |
| C08F 2/48 | (2006.01) | |
| C08F 220/18 | (2006.01) | |
| C08K 5/06 | (2006.01) | |
| C08K 5/3492 | (2006.01) | |
| C08K 5/5397 | (2006.01) | |
| C08K 5/544 | (2006.01) | |

(52) U.S. Cl.
CPC .................. *C09J 4/06* (2013.01); *C08F 2/48* (2013.01); *C08F 220/1804* (2020.02); *C08K 5/06* (2013.01); *C08K 5/34924* (2013.01); *C08K 5/5397* (2013.01); *C08K 5/544* (2013.01); *C09J 2203/318* (2013.01); *Y10T 428/2891* (2015.01)

(58) Field of Classification Search
None
See application file for complete search history.

(56) References Cited

U.S. PATENT DOCUMENTS

| | | | |
|---|---|---|---|
| 5,780,526 A | 7/1998 | Matsui et al. | |
| 2008/0299388 A1 | 12/2008 | Murakami et al. | |
| 2012/0328800 A1 | 12/2012 | Yoon et al. | |
| 2014/0120268 A1* | 5/2014 | Akiyama | C09J 7/385 |
| | | | 427/492 |

FOREIGN PATENT DOCUMENTS

| | | |
|---|---|---|
| CN | 105143378 A | 12/2015 |
| JP | 2018119108 A | 8/2018 |
| KR | 20050021976 A | 3/2005 |
| KR | 20060055756 A | 5/2006 |
| KR | 20120073088 A | 7/2012 |
| KR | 101243658 B1 | 3/2013 |
| KR | 20130130927 A | 12/2013 |
| KR | 20140056030 A | 5/2014 |
| KR | 20190079425 A | 7/2019 |
| KR | 20190079426 A | 7/2019 |
| KR | 20190089651 A | 7/2019 |
| WO | 2018168284 A1 | 9/2018 |

OTHER PUBLICATIONS

Search Report dated Sep. 7, 2022 from Office Action for Chinese Application No. 202080021462.5 issued Sep. 15, 2022. 3 pgs.
International Search Report for PCT/KR2020/012969 dated Jan. 8, 2021. 2 pgs.
Extended European Search Report for Application No. 20869135.2 dated May 23, 2022, pp. 1-5.

* cited by examiner

*Primary Examiner* — Anish P Desai
(74) *Attorney, Agent, or Firm* — Lerner David LLP

(57) ABSTRACT

An acrylic adhesive composition including an acrylic copolymer formed by polymerizing a monomer mixture is provided. The monomer mixture includes a monomer represented by [Formula 1], a (meth)acrylic monomer having a crosslinkable functional group, and an alkyl (meth)acrylate-based monomer. The acrylic copolymer has a branched polymer structure. The acrylic composition also includes a polyfunctional acrylate having two or more radically polymerizable functional groups, a first photoinitiator, and a second photoinitiator, wherein the first photoinitiator is an acetophenone-based photoinitiator, and the second photoinitiator is a phosphine oxide-based photoinitiator.

17 Claims, No Drawings

ACRYLIC ADHESIVE COMPOSITION, POLARIZING PLATE, AND DISPLAY DEVICE

CROSS-REFERENCE TO RELATED APPLICATIONS

The present application is a national stage entry under 35 U.S.C. § 371 of International Application No. PCT/KR2020/012969 filed on Sep. 24, 2020, which claims priority to Korean Patent Application No. 10-2019-0120028, filed on Sep. 27, 2019, in the Korean Intellectual Property Office, the disclosures of which are incorporated herein in their entirety by reference.

TECHNICAL FIELD

The present invention relates to an acrylic adhesive composition, a polarizing plate, and a display device, and more particularly, to an acrylic adhesive composition capable of implementing low viscosity properties even when the solid content is high, not showing much change in adhesion over time, and having excellent rework properties and durability, and a polarizing plate and a display device manufactured using the same.

BACKGROUND ART

In general, a liquid crystal display device (LCD) is provided with a crystal cell including a liquid crystal, and a polarizing plate, and an adhesive layer is used to attach the crystal cell and the polarizing plate. As an adhesive for adhering a polarizing plate which forms the adhesive layer, an acrylic resin, rubber, a urethane-based resin, a silicone-based resin, or ethylene vinyl acetate (EVA) is used. Among the above, an adhesive using an acrylic resin having transparency, oxidation resistance, and yellowing resistance as a base is widely used.

In the case of an acrylic adhesive for a polarizing plate, it is preferable to use an acrylic resin having a high weight average molecular weight to improve durability and curing efficiency. When an acrylic resin having a low weight average molecular weight is used, curing efficiency is reduced, so that a curing rate is reduced, and the cohesion and curability of an adhesive are also reduced under high temperature or high temperature/high humidity conditions, so that durability is reduced.

However, an acrylic resin having a high weight average molecular weight is used, there is a problem in that the viscosity of a coating solution is increased, thereby reducing workability. Although it is possible to control the viscosity of a coating solution by reducing the solid content in the coating solution, when an adhesive layer is formed using a coating solution having a low solid content, there are problems in that manufacturing cost is increased to reduce productivity, and it is difficult to precisely control the thickness of the adhesive layer.

Therefore, as a method for increasing the solid content while maintaining the viscosity of a coating solution at an appropriate level, a method such as mixing a low molecular weight body, or increasing the content of a curing agent, and the like have been proposed. However, in the case of a method of mixing a low molecular weight body, an adhesive layer is easily deformed, so that when a polarizing plate is stored in the form of a roll during a polarizing plate manufacturing process, the adhesive layer is easily pressed and deformed (pit), and when a polarizing plate is cut, an adhesive leaks out of the cut surface, so that there is a problem in that the polarizing plate is prone to contamination. In addition, when the content of a curing agent is increased, there are problems in that adhesion force is greatly increased when a certain period of time elapses after a polarizing plate is adhered to a liquid crystal panel, which makes it difficult to rework, and that adhesive physical properties are likely to change over time due to the influence of a residual curing agent.

In order to solve the above problems, the present inventors developed an adhesive composition using a copolymer having a branched polymer structure and having lower viscosity properties than a linear copolymer having an equivalent level of weight average molecular weight, and filed for a patent application (Korean Patent Application No. 10-2017-0181616). The adhesive composition of the patent application has a viscosity lower than that of a typical adhesive composition, thereby having excellent coating properties as well as excellent rework properties and change in physical properties over time. However, although the adhesive composition exhibits good durability under a high temperature condition of about 80° C., the durability thereof is poor under a high temperature condition of 100° C. or higher.

DISCLOSURE OF THE INVENTION

Technical Problem

An aspect of the present invention provides an acrylic adhesive composition for a polarizing plate having excellent coating properties and rework properties, not showing much change in an adhesive layer, and having excellent durability even under a harsh condition of 110° C. or higher.

Another aspect of the present invention provides a polarizing plate including an adhesive layer formed by the acrylic adhesive composition and a display device including the polarizing plate.

Technical Solution

According to an aspect of the present invention, there is provided an acrylic adhesive composition including an acrylic copolymer formed by polymerizing a monomer mixture including a monomer represented by [Formula 1] below, a (meth)acrylic monomer having a crosslinkable functional group, and an alkyl (meth)acrylate-based monomer, and having a branched polymer structure, a polyfunctional acrylate having two or more radically polymerizable functional groups, and an acetophenone-based first photoinitiator and a phosphine oxide-based second photoinitiator.

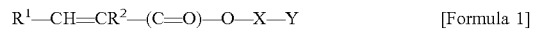
$R^1$—CH=$CR^2$—(C=O)—O—X—Y  [Formula 1]

In Formula 1, $R^1$ is hydrogen, a C1-C6 alkyl group, or a C2-C6 alkenyl group, $R^2$ is hydrogen or a C1-C10 alkyl group, X is a single bond, a C1-C10 alkylene group, a C2-C10 alkenylene group, ether, ester, or a combination thereof, and Y is a vinyl group, an allyl group, or a C3-C10 cycloalkenyl group.

According to another aspect of the present invention, there is provided a polarizing plate including a polarizing film and an adhesive layer formed on one surface or both surfaces of the polarizing film and including a cured product of the acrylic adhesive composition according to the present invention.

According to yet another aspect of the present invention, there is provided a display device including the polarizing plate according to the present invention.

Advantageous Effects

An acrylic adhesive composition according to the present invention includes an acrylic copolymer having a branched structure, and thus, may implement a low viscosity even when an acrylic copolymer having a relatively high weight average molecular weight is used. Accordingly, when the acrylic adhesive composition according to the present invention is used, a low viscosity may be implemented even when the solid content in a coating solution is as high as 35 wt % or greater, so that coating workability is excellent when forming an adhesive layer and productivity is high, and also, the thickness of the adhesive layer may be precisely controlled.

In addition, the acrylic adhesive composition according to the present invention includes a polyfunctional acrylate and a combination of two types of specific photoinitiators together with the acrylic copolymer having a branched structure, so that an additional crosslinked structure is firmly formed when an adhesive layer is formed, and thus, excellent durability may be implemented even under a harsh condition of 110° C. or higher.

In addition, a polarizing plate including an adhesive layer formed by using the acrylic adhesive composition according to the present invention has excellent durability even under harsh conditions and shows not much change in adhesive physical properties over time, and thus, is excellent in quality.

BEST MODE FOR CARRYING OUT THE INVENTION

In the present specification, when terms such as "include", "has", and "is composed of" are used, other parts may be added unless "only" is used. Elements of a singular form may include elements plural forms unless the context clearly indicates otherwise.

In interpreting elements, it is to be construed as including an error range even if there is no separate explicit recitation.

In the present specification, "(meth)acrylic" is a generic term for acrylic and meth acrylic. For example, (meth) acrylate includes methacrylate and acrylate, and (meth) acrylic acid includes acrylic acid and methacrylic acid.

In the present specification, the term "X to Y" indicating a range refers to "equal to or more than X to equal to or less than Y".

In the present specification, "branched polymer structure" refers to a polymer structure having two or more long chains grown in different directions.

Hereinafter, the present invention will be described in detail.

Adhesive Composition

An acrylic adhesive composition according to the present invention includes (1) an acrylic copolymer having a branched copolymer structure, (2) a polyfunctional acrylate having two or more radically polymerizable functional groups, and (3) two types of photoinitiators.

Hereinafter, each component of the adhesive composition of the present invention will be described in detail.

(1) Acrylic Copolymer

The acrylic adhesive composition according to the present invention includes an acrylic copolymer having a branched polymer structure and formed by polymerizing a monomer mixture including a monomer represented by [Formula 1] below, a (meth)acrylic monomer having a crosslinkable functional group, and an alkyl (meth)acrylate-based monomer.

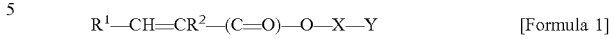

$$R^1—CH=CR^2—(C=O)—O—X—Y \qquad \text{[Formula 1]}$$

In Formula 1, $R^1$ is hydrogen, a C1-C6 alkyl group, or a C2-C6 alkenyl group, $R^2$ is hydrogen or a C1-C10 alkyl group, X is a single bond, a C1-C10 alkylene group, a C2-C10 alkenylene group, ether, ester, or a combination thereof, and Y is a vinyl group, an allyl group, or a C3-C10 cycloalkenyl group.

The monomer represented by [Formula 1] is to form an acrylic copolymer of a branched polymer structure. Typically, as an acrylic copolymer used in an adhesive for a polarizing plate, acrylic copolymers having a linear polymer structure in which monomers are polymerized in one long chain form have been mainly used. However, when acrylic copolymers having the above linear polymer structure are used, viscosity is also increased as weight average molecular weight is increased, so that there is a problem in that workability is reduced.

However, it has been discovered that when an acrylic copolymer is formed by adding the monomer represented by [Formula 1] above, a copolymer having a branched polymer structure, not a linear structure, is formed. Specifically, the monomer of the above [Formula 1] has two or more ethylene groups, in which radicals may be formed respectively in free radical polymerization and chains may grow in different directions. As a result, a branched polymer having two or more chains of different growth direction is formed. The acrylic copolymer having the branched polymer structure has lower viscosity properties than an acrylic copolymer of a linear polymer structure having an equivalent level of weight average molecular weight, so that even though the solid content is increased in a coating liquid, excellent coating properties may be implemented.

Specific examples of the monomer represented by [Formula 1] above include one or more selected from the group consisting of allyl methacrylate, allyl acrylate, methallyl methacrylate, methallyl acrylate, 3-butenyl acrylate, but-3-enyl-2-methylprop-2-enoate, 2-allyloxyethyl acrylate, 2-allyloxyethyl methacrylate, 3-allyloxypropyl methacrylate, 3-allyloxypropyl acrylate, 2-allyloxyethoxyethyl methacrylate, 2-allyloxyethoxyethyl acrylate, cyclohex-2-enyl acrylate, cyclohex-2-en-1-yl 2-methylprop-2-enoate, and 3-vinylcyclohex-2-enyl acrylate, but are not limited thereto.

The monomer represented by [Formula 1] above may be included in an amount of 0.01 to 1 part by weight, preferably 0.05 to 0.8 parts by weight, more preferably 0.1 to 0.6 parts by weight based on 100 parts by weight of the monomer mixture. When the content of the monomer represented by [Formula 1] is less than 0.01 parts by weight, it is difficult to prepare a copolymer having low viscosity properties. When greater than 1 part by weight, a crosslinking reaction progresses during a polymerization reaction, so that it is difficult to control the increase in molecular weight and viscosity.

Meanwhile, the (meth)acrylic monomer having a crosslinkable functional group is to improve durability, adhesion, and cohesion of an additive. Examples thereof may include a hydroxy group-containing monomer, a carboxy-containing monomer, or a nitrogen-containing monomer, but are not limited thereto. Specific examples of the hydroxy group-containing monomer may include 2-hydroxyethyl (meth) acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth) acrylate, 2-hydroxypropylene glycol (meth)acrylate, or the like. Examples of the carboxy-containing monomers may include (meth)acrylic acid, 2-(meth)acryloyloxy acetic acid, 3-(meth)acryloyloxy propyl acid, 4-(meth)acryloyloxy butyric acid, acrylic acid duplex, itaconic acid, maleic acid, maleic anhydride, and the like. Examples of the nitrogen-containing monomer may include (meth)acrylamide, N-vinylpyrrolidone, or N-vinylcaprolactam, and the like. However, the embodiment of the present invention is not limited thereto.

The (meth)acrylic monomer having a crosslinkable functional group may be included in a content of 0.1 to 15 parts by weight, preferably 1 to 10 parts by weight, more preferably 1 to 5 parts by weight based on 100 parts by weight of the monomer mixture. When the content of the (meth)acrylic monomer including a crosslinkable functional group satisfies the above range, more excellent adhesion and durability may be obtained.

Next, the alkyl (meth)acrylate-based monomer is to impart adhesion, preferably includes an alkyl group having 2 to 14 carbon atoms. When an alkyl group included in the alkyl (meth)acrylate-based monomer is in high concentration, the cohesion of an adhesive is deteriorated and it may be difficult to control glass transition temperature (Tg) or adhesion properties. Examples of the alkyl (meth)acrylate-based monomer may include ethyl (meth)acrylate, n-propyl (meth)acrylate, isopropyl (meth)acrylate, n-butyl (meth) acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth) acrylate, isononyl (meth)acrylate, lauryl (meth)acrylate, and tetradecyl (meth)acrylate. In the present invention, any one thereof or a mixture of two or more thereof may be used.

The alkyl (meth)acrylate-based monomer may be included in an amount of 84 parts by weight to 99.88 parts by weight, preferably 89.2 parts by weight to 96.95 parts by weight, more preferably 94.4 parts by weight to 98.9 parts by weight based on 100 parts by weight of the monomer mixture. When the content of the alkyl (meth)acrylate-based monomer satisfies the above range, excellent adhesion and durability may be obtained.

According to an embodiment, the (meth)acrylic copolymer may be formed by polymerizing a monomer mixture including 84 to 99.89 parts by weight of the alkyl (meth) acrylate-based monomer, 0.01 to 15 parts by weight of the (meth)acrylic monomer including a crosslinkable functional group, and 0.01 to 1 part by weight of the monomer represented by [Formula 1] based on 100 parts by weight of the monomer mixture.

The acrylic copolymer according to the present invention may be prepared by mixing each of the monomers described above to prepare a monomer mixture, and then polymerizing the mixture. At this time, the polymerization method is not particularly limited. Various polymerization methods known in the art, such as solution polymerization, photo polymerization, bulk polymerization, suspension polymerization, and emulsion polymerization may be used. During the polymerization, a polymerization initiator, a molecular weight control agent and the like may be additionally added. The injection time of each component is not particularly limited. That is, the components may be injected all at once, or may be injected at different times in installments.

In the present invention, an acrylic copolymer may be prepared by solution polymerization, in particular. It is preferable that the solution polymerization is performed by adding an initiator, a molecular weight control agent and the like at a polymerization temperature of 50° C. to 140° C. in the state in which each monomer is uniformly mixed.

Examples of the initiator which can be used in the process may include conventional initiators, for example, an azo-based initiator such as azobisisobutyronitrile and azobiscyclohexane carbonitrile and the like; and/or peroxide such as benzoyl peroxide and acetyl peroxide. Any one thereof or a mixture of two or more thereof may be used, but the initiator is not limited thereto.

In addition, as the molecular weight control agent, mercaptans such as dodecylmercaptan and n-dodecylmercaptan, terpenes such as dipentene and t-terpene, chloroform, or halogenated hydrocarbon of carbon tetrachloride, or pentaerythritoltetrakis 3-mercapto propionate, and the like may be used. However, the molecular weight control agent is not limited thereto.

The acrylic copolymer used in the present invention may have a weight average molecular weight of 300,000 to 1,000,000 g/mol, preferably 400,000 to 1,000,000 g/mol, and more preferably 500,000 to 1,000,000 g/mol. When the weight average molecular weight of the acrylic copolymer is less than 300,000 g/mol, physical properties, such as cohesion, rework force, and durability, may be reduced. When greater than 1,000,000 g/mol, coating properties may be reduced due to an increase in viscosity.

(2) Polyfunctional Acrylate

The acrylic adhesive composition according to the present invention includes a polyfunctional acrylate together with the acrylic copolymer. The polyfunctional acrylate is to improve the high-temperature durability of an adhesive layer by forming a crosslinked structure when the adhesive layer is cured, and is an acrylate having two or more radically polymerizable functional groups.

The polyfunctional acrylate that may be used in the present invention is, for example, a difunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate, di(meth)acrylate, hydroxyl puivalic acid, neopentylglycol di(meth)acrylate, dicyclopentanyl, di(meth)acrylate, caprolactone-modified dicyclopentenyl di(meth)acrylate, ethylene oxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethylene oxide-modified hexahydrophthalic acid di(meth)acrylate, tricyclodecane dimethanol(meth)acrylate, neopentylglycol-modified trimethylpropane di(meth)acrylate, adamantane di(meth) acrylate, or 9,9-bis[4-(2-acryloyloxyethoxy)phenyl]fluorene, and the like, a trifunctional acrylates such as trimethylolpropane tri(meth)acrylate, dipentaerythritol tri(meth) acrylate, propionic acid-modified dipentaerythritol tri(meth) acrylate, pentaerythritol tri(meth)acrylate, propylene oxide-modified trimethylolpropane tri(meth)acrylate, trifunctional urethane (meth)acrylate, or tris(meth)acryloyloxyethyl isocyanurate, a tetrafunctional acrylate such as diglycerin tetra (meth)acrylate or pentaerythritol tetra(meth)acrylate, a 5-functional acrylate such as propionic acid-modified dipentaerythritol penta(meth)acrylate, and a 6-functional acrylates such as dipentaerythritol hexa(meth)acrylate, caprolactone-modified dipentaerythritol hexa(meth)acrylate, or urethane (meth)acrylate (ex. isocyanate monomer and a reactant of trimethylolpropane tri(meth)acrylate), and the like, but is not limited thereto.

In the present invention, one or two or more of the above polyfunctional acrylates may be mixed and used. Particularly, it is preferable to use an acrylate of trifunctional or higher having a molecular weight of less than 1,000 g/mol in terms of implementing more excellent durability, but the present invention is not limited thereto.

In addition, as the polyfunctional acrylate, an acrylate having a ring structure or a urethane bond in the molecules thereof may be preferably used. When such an acrylate is used, it is possible to form an adhesive in a harder state and suppress the degradation in adhesive force at the same time. Accordingly, there is an effect of suppressing light leakage, and it is possible to further enhance durability. In the above, a ring structure that may be included in an acrylate may be any one of a carbocyclic structure or a heterocyclic structure, or a monocyclic or polycyclic structure.

Specific examples of the polyfunctional acrylate include an isocyanurate-based acrylate such as tris(meth)acryloyloxyethyl isocyanurate, an adduct obtained by adding a compound having a hydroxy group and an acryloyl group (ex. pentaerythritol tri(meth)acrylate, etc.) to a compound having an isocyanurate group at a molecule end and the like, preferably a compound having a ring structure in a molecule and having an isocyanurate group (ex. isoborone diisocyanate), and the like, but the present invention is not limited thereto.

In the adhesive composition of the present invention, the polyfunctional acrylate may be included in a content of 1 part by weight to less than 20 parts by weight, preferably 5 to 15 parts by weight based on 100 parts by weight of an acrylic resin. When the content of the polyfunctional acrylate is less than 1 part by weight, the effect of increasing durability is insignificant. When equal to or greater than 20 parts by weight, high-temperature durability may be rather reduced.

(3) Photoinitiator

The adhesive composition according to the present invention includes two types of photoinitiators to polymerize the polyfunctional acrylate, thereby forming a crosslinked structure. Specifically, the photoinitiator includes a first photoinitiator, which is an acetophenone-based photoinitiator, and a second photoinitiator, which is a phosphine oxide-based photoinitiator.

Specifically, the first photoinitiator may be, for example, acetophenone, dimethylamino acetophenone, 2,2-dimethoxy-2-phenylacetophenone, 2,2-diethoxy-2-phenylacetophenone, and the like. Among the above, 2,2-dimethoxy-2-phenylacetophenone is particularly preferable in that there is no risk of change in adhesive physical properties over time and discoloration.

In addition, the second photoinitiator may be, for example, bis(2,4,6-trimethylbenzoyl)-4-methylphenylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenyl phosphine oxide, bis (2,4,6-trimethylbenzoyl)-2,3,5,6-tetramethylphenylphosphine oxide, 2,4,6-trimethylbenzoyl-diphenyl phosphine oxide, bis(2,4,6-trimethylbenzoyl)-phenylphosphine oxide, and the like. Among the above, 2,4,6-trimethylbenzoyl-diphenyl phosphine oxide is particularly preferable in that there is no risk of change in adhesive physical properties over time and discoloration, and in that it is possible to cure the inside of an adhesive layer since a UV wavelength of a long wavelength of 360 nm to 400 nm may be absorbed.

According to the research of the present inventors, when a polyfunctional acrylate, and an acetophenone-based photoinitiator and a phosphine oxide-based photoinitiator are added to an adhesive composition, high-temperature durability at 110° C. or higher is significantly improved. In the case of an acetophenone-based photoinitiator, the light absorption ability in the 300 to 320 nm band is somewhat insufficient, and in the case of a phosphine oxide-based photoinitiator, the light absorption ability in the 330 to 350 nm band is somewhat insufficient. However, as in the present invention, when an acetophenone-based photoinitiator and an a phosphine oxide-based photoinitiator are used together, the wavelength absorption ability each thereof is complemented, so that wavelengths of all of UV A region (315 to 400 nm), UV B region (280 nm to 315 nm), and UV C region (200 nm to 280 nm) may be widely adsorbed, thereby increasing curing efficiency. As a result, the cross-linked structure inside and outside of an adhesive layer is uniformly and firmly formed, so that high-temperature durability is significantly increased. In comparison, when only one type of a photoinitiator was used with a polyfucntional acrylate, or even when two types of photoinitiators were used, if it was not the combination of an acetophenone-based photoinitiator and a phosphine oxide-basedphotoinitiator but another combination of photoinitiators, high-temperature durability at 110° C. or higher was not satisfied. In the adhesive composition of the present invention, the first photoinitiator may be included in a content of 1.0 to 5.0 parts by weight, preferably 1.0 to 3.0 parts by weight, and more preferably 1.0 to 2.0 parts by weight based on 100 parts by weight of the acrylic copolymer, and the second photoinitiator may be included in a content of 0.01 to 1 part by weight, preferably 0.01 to 0.7 parts by weight, and more preferably 0.1 to 0.5 parts by weight based on 100 parts by weight of the acrylic copolymer. When the content of the first photoinitiator is out of the range, there is a risk that a reaction with a polyfunctional acrylate is not facilitated or that the physical properties of an adhesive may be deteriorated due to residual components after the reaction. When the content of the second photoinitiator is less than 0.01 parts by weight, the effect of increasing high-temperature durability is insignificant, and when greater than 1 part by weight, high-temperature durability may be rather reduced.

(4) Polyfunctional Crosslinking Agent

The adhesive composition of the present invention may further include a polyfunctional crosslinking agent in addition to the above components.

The polyfunctional crosslinking agent is to further improve the durability of an adhesive layer by reacting with an acrylic copolymer, thereby forming a crosslinked structure, and for example, an isocyanate-based crosslinking agent may be used. As the isocyanate-based crosslinking agent, any typical isocyanate-based crosslinking agent known in the art may be used. For example, toluene diisocyanate, 2,4-trilene diisocyanate, 2,6-trilene diisocyanate, hydrogenated trilene diisocyanate, isoform diisocyanate, 1,3-xylene diisocyanate, 1,4-xylene diisocyanate, diphenylmethane-4,4-diisocyanate, 1,3-bisisocyanatomethyl cyclohexane, tetramethyl xylylene diisocyanate, 1,5-naphthalene diisocyanate, hexamethylene diisocyanate, 2,2,4-trimethylhexamethylene diisocyanate, 2,4,4-trimethylhexamethylene diisocyanate, trimethylolpropane-modified toluene diisocyanate, trimethylolpropane-modified tolylene diisocyanate, trilene diisocyanate adduct of trimethylolpropane, xylenediosocyanate adduct of trimethylolpropane, triphenylmethane triisocyanate, methylene bistriisocyanate, a polyol(trimethylol propane) thereof, and a mixture thereof, and the like may be used.

It is preferable that the polyfunctional crosslinking agent is included in an amount of 0.01 to 5 parts by weight, preferably 0.01 to 3 parts by weight, and more preferably 0.1 to 1 part by weight based on 100 parts by weight of an acrylic copolymer. When the content of the polyfunctional crosslinking agent satisfies the above range, excellent durability may be achieved without the deterioration in physical properties such as adhesion.

(5) Other Components

In order to control physical properties, the adhesive composition of the present invention may further include other components, such as a solvent, a silane coupling agent, an adhesive imparting resin, and an additive, in addition to the components described above.

The adhesive composition of the present invention may further include a solvent for controlling viscosity. At this time, the solvent may be, for example, ethyl acetate, n-pentane, isopentane, neopentane, n-hexane, n-octane, n-heptane, methyl ethyl ketone, acetone, toluene, or a combination thereof, but is not limited thereto. The solvent may be included in an amount such that the solid content in the adhesive composition is 30 wt % or greater, preferably 30 to 60 wt %.

In addition, the adhesive composition of the present invention may further include a silane coupling agent. The silane coupling agent improves adhesion and adhesion stability between the adhesive and a glass substrate, thereby improving heat resistance and moisture resistance. In addition, the silane coupling agent improves adhesion reliability when the adhesive is left for a long time under high temperature and/or high humidity conditions. Examples of the silane coupling agent that may be used in the present invention include γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyl trimethoxysilane, vinyl triethoxy silane, γ-methacryloxypropyl trimethoxy silane, γ-methacryloxypropyl triethoxy silane, γ-aminopropyl trimethoxy silane, γ-aminopropyl triethoxy silane, 3-isocyanatopropyl triethoxy silane, γ-acetoacetatepropyl trimethoxysilane, γ-acetoacetatepropyl triethoxy silane, β-cyanoacetyl trimethoxy silane, β-cyanoacetyl triethoxy silane, and acetoxyacetato trimethoxy silane, and any one thereof or a mixture of two or more thereof may be used. In the present invention, it is preferable to use a silane coupling agent having an acetoacetate group or a β-cyanoacetyl group, but the embodiment of the present invention is not limited thereto.

In the composition of the present invention, the silane coupling agent may be included in an amount of 0.01 parts by weight to 5 parts by weight, preferably 0.01 parts by weight to 1 part by weight based on 100 parts by weight of the acrylic copolymer. When the content of the coupling agent is less than 0.01 parts by weight, the effect of increasing adhesion is insignificant. When greater than 5 parts by weight, durability may be deteriorated.

In terms of controlling adhesion performance, the adhesive composition of the present invention may further include 1 part by weight to 100 parts by weight of an adhesive imparting resin based on 100 parts by weight of the acrylic copolymer. The type of the adhesive imparting resin is not particularly limited. For example, any one of or a mixture of two or more of (hydrogenated) hydrocarbon-based resin, (hydrogenated) rosin resin, (hydrogenated) rosin ester resin, (hydrogenated) terpene resin, (hydrogenated) terpene phenol resin, polymerized rosin resin, or polymerized rosin ester resin, and the like, may be used. When the content of the adhesive imparting resin is less than 1 part by weight, the effect of adding the adhesive imparting resin may be insignificant. When greater than 100 parts by weight, the effect of improving compatibility and/or cohesion may be deteriorated.

The adhesive composition of the present invention may further include one or more additives selected from the group consisting of an epoxy resin, anti-static agent, an ultraviolet stabilizer, an anti-oxidation agent, a coloring agent, a reinforcing agent, a filler, an anti-foaming agent, a surfactant, and a plasticizer, to the extent that the effect of the invention is not affected.

The adhesive composition according to the present invention including the above components has low viscosity properties compared to a typical adhesive composition using an acrylic copolymer in a linear polymer structure and having the same level of weight average molecular weight. Accordingly, even when the solid content in the adhesive composition is high, excellent coating properties may be implemented.

Specifically, the adhesive composition according to the present invention exhibits a low viscosity of 2,000 cP or less, preferably 500 cP to 2,000 cP at 23° C., even when the solid content is 35 wt % or greater, for example, 35 wt % to 60 wt %. At this time, the solid content may refer to a solid content at the time when the adhesive composition of the present invention prepared in the form of a coating solution or the like is applied in the manufacturing process of an adhesive. As described above, when the adhesive composition of the present invention is used, the solid content in the coating solution may be increased without the deterioration in coating properties, so that not only productivity is excellent, but also precision control of, such as thickness, may be achieved.

In addition, the adhesive composition according to the present invention includes a polyfunctional acrylate and two types of photoinitiators to form a stable crosslinked structure when curing an adhesive layer, thereby exhibiting excellent durability even under a harsh condition of 110° C. or higher.

Polarizing Plate

Next, a polarizing plate according to the present invention will be described.

The polarizing plate according to the present invention includes a polarizing film and an adhesive layer formed on one surface or both surfaces of the polarizing plate and containing a cured product of the adhesive composition according to the inventive concept described above.

The type of the polarizing layer used in the present invention is not particularly limited. A typical type known in the art may be employed. For example, the polarizing film may include a polarizer and a protective film formed on one surface or both surfaces of the polarizer.

The type of the polarizer included in the polarizing plate of the present invention is not particularly limited. For example, a typical type known in the art such as polyvinyl alcohol-based polarizer will be employed without limitation.

The polarizer is a functional film or sheet capable of extracting only light which vibrates in one direction from light which is incident while vibrating in various directions. The polarizer described above may be, for example, in the form in which a dichroic pigment is adsorbed onto a polyvinyl alcohol-based resin film. The polyvinyl alcohol-based resin constituting the polarizer may be obtained, for example, by gelling a polyvinyl acetate-based resin. In this case, the polyvinyl acetate-based resin to be used may include a homopolymer of vinyl acetate as well as a copolymer of vinyl acetate and another monomer copolymerizable with the same. Examples of the monomer copolymerizable with vinyl acetate include a mixture of one or two or more of an unsaturated carboxylic acid, an olefin, a vinyl ether, an unsaturated sulfonic acid, and an acrylamide having an ammonium group, but are not limited thereto. The degree of gelation of the polyvinyl alcohol-based resin is typically 85 mol % to 100 mol %, preferably 98 mol % or greater. The polyvinyl alcohol-based resin may be further modified. For example, a polyvinyl formal or a polyvinyl acetal modified with an aldehyde group may also be used. Also, the degree of polymerization of the polyvinyl alcohol-based resin may typically be 1,000 to 10,000, preferably 1,500 to 5,000.

The polyvinyl alcohol-based resin described above may be defilmed to be used as a disc film of the polarizer. A method for defilming the polyvinyl alcohol-based resin is not particularly limited. A typical method known in the art may be used.

The thickness of the disc film defilmed with the polyvinyl alcohol-based resin is not particularly limited, and may be appropriately controlled, for example, in the range of 1 μm to 150 μm. In consideration of the ease of stretching and the like, the thickness of the disc film may be controlled to be 10 μm or greater.

The polarizer may be manufactured by stretching (ex. uniaxial stretching) the polyvinyl alcohol-based resin film described above, and then dyeing the stretched polyvinyl alcohol-based resin film with a dichroic dye and allowing the dichroic dye to be adsorbed, followed by treating the polyvinyl alcohol-based resin film adsorbed with the dichroic dye with a boric acid aqueous solution, and performing washing after the treatment with the boric acid aqueous solution. In the above, as the dichroic pigment, iodine or a dichroic organic dyes and the like may be used.

The polarizing film of the present invention may also include a protective film formed on one surface or both surfaces of the polarizer. The type of the protective film that may be included in the polarizing plate of the present invention is not particularly limited. For example, the protective film may be formed of a cellulose-based film such as triacetyl cellulose, a polyester-based film such as a polycarbonate film or a polyethylene terephthalate film, a polyether sulfone-based film, and/or a polyethylene film, a polypropylene film, or a polyolefin film having a cyclo-based or norbornene-based structure, or a multi-layered film in which a protective film composed of a polyolefin-based film such as an ethylene propylene copolymer is laminated. At this time, the thickness of the protective film is not particularly limited, either. The protective film may be formed to a typical thickness.

Meanwhile, in the present invention, a method for forming an adhesive layer on the polarizing film is not particularly limited. For example, a method of applying and curing an adhesive composition (coating liquid) on the film or a device by a typical means such as a bar coater, or a method of applying and curing an adhesive composition on the surface of a peelable base material, and then transferring an adhesive layer formed to the surface of a polarizing film or the device.

In the present invention, a process of forming an adhesive layer is preferably performed after sufficiently removing a volatile component, or a bubble-inducing component such as reaction residues inside the adhesive composition (coating liquid). As a result, a problem in which the crosslinking density or molecular weight of the adhesive is too low, thereby lowering the elastic modulus, or bubbles present between a glass plate and the adhesive layer become bigger, thereby forming a scatterer therein may be prevented.

Meanwhile, a method for curing the adhesive composition of the present invention during manufacturing the polarizing plate is not particularly limited, either. A typical curing method known in the art may be performed. For example, the curing may be performed by maintaining a temperature at which a crosslinking reaction may be triggered between a crosslinkable functional group and a polyfunctional crosslinking agent in the adhesive composition applied through heating and the like.

The polarizing plate of the present invention may further include one or more functional layers selected from the group consisting of a protective layer, a reflective layer, an anti-glare layer, a phase difference plate, a wide viewing angle compensation film, and a brightness enhancement film.

The above polarizing plate according to the present invention has not much change over time in an adhesive layer, has excellent durability even under high temperature or high temperature/high humidity conditions, and has excellent rework properties.

Display Device

Next, a display device according to the present invention will be described.

The display device of the present invention includes the above-described polarizing plate according to the present invention.

More specifically, the display device may be a liquid crystal display device including a liquid crystal panel having the polarizing plate according to the present invention bonded on one surface or both surfaces thereof. At this time, the type of the liquid crystal panel is not particularly limited. In the present invention, any known liquid crystal panel may be applied without being limited to the type thereof. For example, a liquid crystal panel of various passive matrix methods including a twisted neumatic (TN) type, a super twisted neutral (STN) type, a ferroelectric (F) type, and a polymer dispersed (PD) LCD type, a liquid crystal panel of various active matrix systems including a two terminal-type and a three terminal-type, an IPS mode panel, or a VA mode panel may be applied. In addition, the type and manufacturing method of other configurations included in the liquid crystal display device of the present invention are not particularly limited. Common configurations in the field may be employed and used without limitation.

MODE FOR CARRYING OUT THE INVENTION

Hereinafter, the present invention will be described in more detail with reference to specific examples.

Preparation Example 1: Preparation of Acrylic Copolymer (A1)

To a 3 L reactor in which nitrogen gas is refluxed and a cooling device is installed to facilitate temperature control, a monomer mixture including 97.2 parts by weight of butyl acrylate (BA), 2.5 parts by weight of hydroxybutyl acrylate (HEA), and 0.18 parts by weight of allyl methacrylate (AMA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.23 parts by weight of n-dodecylmercaptan (n-DDM) as a molecular weight control agent, 0.15 parts by weight of azobis (2,4-dimethylvaleronitrile) (V-65, Manufacturer: Wako) as a polymerization initiator, and 0.12 parts by weight of allyl methacrylate (AMA) were further injected thereto, and then the mixture was subjected to a reaction for 10 hours to prepare an acrylic copolymer (A1). At this time, the allyl methacrylate was injected 3 hours after the reaction started. The molecular weight control agent was injected in five divided portions in the 5 hours after the reaction started, and the polymerization initiator was injected in 10 divided portions in the 7 hours after the reaction started while checking the degree of heat generation.

Preparation Example 2: Preparation of Acrylic Copolymer (A2)

To a 3 L reactor in which nitrogen gas is refluxed and a cooling device is installed to facilitate temperature control, a monomer mixture including 97.0 parts by weight of butyl acrylate (BA), 2.5 parts by weight of hydroxybutyl acrylate (HEA), and 0.3 parts by weight of allyl methacrylate (AMA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.185 parts by weight of n-dodecylmercaptan (n-DDM) as a molecular weight control agent, 0.15 parts by weight of azobis (2-4-dimethylvaleronitrile) (V-65, Manufacturer: Wako) as a polymerization initiator, and 0.2 parts by weight of allyl methacrylate (AMA) were further injected thereto, and then the mixture was subjected to a reaction for 10 hours to prepare an acrylic copolymer (A2). At this time, the allyl methacrylate was injected 3 hours after the reaction started. The molecular weight control agent was injected in five divided portions in the 5 hours after the reaction started, and the polymerization initiator was injected in 10 divided portions in the 7 hours after the reaction started while checking the degree of heat generation.

Preparation Example 3: Preparation of Acrylic Copolymer (B1)

To a 3 L reactor in which nitrogen gas is refluxed, and a cooling device is installed to facilitate temperature control, a monomer mixture including 97.5 parts by weight of butyl acrylate (BA) and 2.5 parts by weight of hydroxybutyl acrylate (HEA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.147 parts by weight of n-dodecylmercaptan (n-DDM) as a molecular weight control agent and 0.15 parts by weight of azobis (2,4-dimethylvaleronitrile) (V-65, Manufacturer: Wako) as a polymerization initiator were further injected thereto, and then the mixture was subjected to a reaction for 10 hours to prepare an acrylic copolymer (B1).

Preparation Example 4: Preparation of Acrylic Copolymer (B2)

To a 3 L reactor in which nitrogen gas is refluxed, and a cooling device is installed to facilitate temperature control, a monomer mixture including 97.5 parts by weight of butyl acrylate (BA) and 2.5 parts by weight of hydroxybutyl acrylate (HEA) were injected. Thereafter, 60 parts by weight of ethyl acetate (EAc) was added thereto as a solvent. Thereafter, nitrogen gas was purged for 60 minutes to remove oxygen, and then the temperature was maintained at 70° C. Thereafter, 0.112 parts by weight of n-dodecylmercaptan (n-DDM) as a molecular weight control agent and 0.15 parts by weight of azobis (2,4-dimethylvaleronitrile) (V-65, Manufacturer: Wako) as a polymerization initiator were further injected thereto, and then the mixture was subjected to a reaction for 10 hours to prepare an acrylic copolymer (B2).

The weight average molecular weight and the polymer structure of the acrylic copolymer prepared in each of Preparation Examples 1 to 4 were measured in the following manner and the results are shown in Table 1 below.

(1) The weight average molecular weight was measured under the following conditions using GPC. In making a calibration curve, the measurement results were converted using standard polystyrene of the Agilent system.
<Measurement Conditions>
Measurement device: Agilent GPC (Agulent 1200 series, USA)
Column: Two PL Mixed B connections
Column temperature: 40° C.
Eluent: tetrahydrofuran
Flow rate: 1.0 mL/min
Concentration: ~1 mg/mL (100 µL injection)

(2) The polymer structure was evaluated in the following manner.

First, a monomer mixture was prepared by mixing the same alkyl (meth)acrylate-based monomer and (meth) acrylic monomer including a crosslinkable functional group as those used in an acrylic copolymer (hereinafter 'evaluation target copolymer'), the polymer structure of which is to be evaluated. At this time, the content of the (meth)acrylic monomer including a crosslinkable functional group in the monomer mixture were set to be the same as the content of the (meth)acrylic monomer including a crosslinkable functional group in the evaluation target copolymer. Thereafter, the monomer mixture was polymerized to prepare an acrylic copolymer (hereinafter 'standard copolymer') having an equivalent level of a weight average molecular weight (error range±5%) to the weight average molecular weight of the evaluation target copolymer.

Thereafter, to each of the standard copolymer and the evaluation target copolymer, an ethyl acetate solvent was added such that the solid concentration was controlled to be 30 wt %, and viscosity was measured. When the viscosity of the evaluation target copolymer which was measured as described above was lower than the viscosity of the standard copolymer by 30% or more, the evaluation target copolymer was evaluated as having a branched polymer structure, and in other cases, the evaluation target copolymer was evaluated as having a linear polymer structure.

TABLE 1

| | | Preparation Example 1 | Preparation Example 2 | Preparation Example 3 | Preparation Example 4 |
|---|---|---|---|---|---|
| Sample | | A1 | A2 | B1 | B2 |
| Composition | BA | 97.2 | 97.0 | 97.5 | 97.5 |
| | HEA | 2.5 | 2.5 | 2.5 | 2.5 |
| | AMA | 0.3 | 0.5 | 0 | 0 |
| n-DDM | | 0.23 | 0.185 | 0.147 | 0.112 |
| Weight average molecular weight | | 520,000 | 970,000 | 530,000 | 940,000 |
| Polymer structure | | branched | branched | linear | linear |

Example 1

100 parts by weight of the acrylic copolymer A1 prepared in Preparation Example 1 was blended with 15 parts by weight of a polyfunctional acrylate(tris(meth)acryloyloxyethyl isocyanurate, 1.5 parts by weight of 2,2-dimethoxy-2-phenylacetophenone (Photoinitiator 1, Trade name: Omnirad BDK, Manufacturer: IGM Resins Co., Ltd.), 0.35 parts by weight of diphenyl(2,4,6-trimethylbenzoyl)phosphine oxide (Photoinitiator 2, Trade name: Omnirad TPO, Manufacturer: IGM Resins Co., Ltd.), 0.2 parts by weight of a polyfunctional crosslinking agent (coronate L, manufactured by Nippon Polyurethane Co., Ltd.), and 0.2 parts by weight of a silane coupling agent (beta-cyanoacetyl group-containing silane coupling agent, LG Chem, M812), and then the mixture was diluted with ethyl acetate such that the solid content of the mixture would be 57.2 wt %. Thereafter, the diluted mixture was uniformly mixed to prepare an adhesive composition (coating solution).

The prepared adhesive composition was applied on a release-treated surface of a release-treated polyethylene terephthalate (release PET) film having a thickness of 38 μm such that the thickness thereof after being dried would be 23 μm, and then dried to form an adhesive coating layer. Thereafter, the adhesive coating layer was laminated on a polarizing plate to manufacture a polarizing plate including an adhesive layer.

Example 2

100 parts by weight of the acrylic copolymer A2 prepared in Preparation Example 2 was blended with 8 parts by weight of a polyfunctional acrylate(tris(meth)acryloyloxyethyl isocyanurate, 1.5 parts by weight of 2-dimethoxy-2-phenylacetophenone (Photoinitiator 1), 0.1 parts by weight of diphenyl(2,4,6-trimethylbenzoyl)phosphine oxide (Photoinitiator 2), 0.2 parts by weight of a polyfunctional crosslinking agent (coronate L, manufactured by Nippon Polyurethane Co., Ltd.), and 0.2 parts by weight of a silane coupling agent (beta-cyanoacetyl group-containing silane coupling agent, LG Chem, M812), and then the mixture was diluted with ethyl acetate such that the solid content of the mixture would be 35.0 wt %. Thereafter, the diluted mixture was uniformly mixed to prepare an adhesive composition (coating solution).

The prepared adhesive composition was applied on a release-treated surface of a release-treated polyethylene terephthalate (release PET) film having a thickness of 38 μm such that the thickness thereof after being dried would be 23 μm, and then dried to form an adhesive coating layer. Thereafter, the adhesive coating layer was laminated on a polarizing plate to manufacture a polarizing plate including an adhesive layer.

Example 3

100 parts by weight of the acrylic copolymer A2 prepared in Preparation Example 2 was blended with 5 parts by weight of a polyfunctional acrylate(tris(meth)acryloyloxyethyl isocyanurate, 1.5 parts by weight of 2,2-dimethoxy-2-phenylacetophenone (Photoinitiator 1), 0.2 parts by weight of diphenyl(2,4,6-trimethylbenzoyl)phosphine oxide (Photoinitiator 2), 0.2 parts by weight of a polyfunctional crosslinking agent (coronate L, manufactured by Nippon Polyurethane Co., Ltd.), and 0.2 parts by weight of a silane coupling agent (beta-cyanoacetyl group-containing silane coupling agent, LG Chem, M812), and then the mixture was diluted with ethyl acetate such that the solid content of the mixture would be 35.1 wt %. Thereafter, the diluted mixture was uniformly mixed to prepare an adhesive composition (coating solution).

The prepared adhesive composition was applied on a release-treated surface of a release-treated polyethylene terephthalate (release PET) film having a thickness of 38 μm such that the thickness thereof after being dried would be 23 μm, and then dried to form an adhesive coating layer. Thereafter, the adhesive coating layer was laminated on a polarizing plate to manufacture a polarizing plate including an adhesive layer.

Example 4

100 parts by weight of the acrylic copolymer A2 prepared in Preparation Example 2 was blended with 15 parts by weight of a polyfunctional acrylate(tris(meth)acryloyloxyethyl isocyanurate, 1.5 parts by weight of 2,2-dimethoxy-2-phenylacetophenone (Photoinitiator 1), 0.5 parts by weight of diphenyl(2,4,6-trimethylbenzoyl)phosphine oxide (Photoinitiator 2), 0.2 parts by weight of a polyfunctional crosslinking agent (coronate L, manufactured by Nippon Polyurethane Co., Ltd.), and 0.2 parts by weight of a silane coupling agent (beta-cyanoacetyl group-containing silane coupling agent, LG Chem, M812), and then the mixture was diluted with ethyl acetate such that the solid content of the mixture would be 35.2 wt %. Thereafter, the diluted mixture was uniformly mixed to prepare an adhesive composition (coating solution).

The prepared adhesive composition was applied on a release-treated surface of a release-treated polyethylene terephthalate (release PET) film having a thickness of 38 μm such that the thickness thereof after being dried would be 23 μm, and then dried to form an adhesive coating layer. Thereafter, the adhesive coating layer was laminated on a polarizing plate to manufacture a polarizing plate including an adhesive layer.

Example 5

An adhesive composition and a polarizing plate were prepared in the same manner as in Example 4 except that 0.7 parts by weight of diphenyl(2,4,6-trimethylbenzoyl)phosphine oxide was used.

Example 6

An adhesive composition and a polarizing plate were prepared in the same manner as in Example 3 except that 20 parts by weight of the polyfunctional acrylate was blended.

Comparative Example 1

An adhesive composition and a polarizing plate were prepared in the same manner as in Example 1 except that diphenyl(2,4,6-trimethylbenzoyl)phosphine oxide (Photoinitiator 2) was not used.

Comparative Example 2

An adhesive composition and a polarizing plate were prepared in the same manner as in Example 2 except that diphenyl(2,4,6-trimethylbenzoyl)phosphine oxide (Photoinitiator 2) was not used.

Comparative Example 3

An adhesive composition and a polarizing plate were prepared in the same manner as in Example 3 except that diphenyl(2,4,6-trimethylbenzoyl)phosphine oxide (Photoinitiator 2) was not used.

Comparative Example 4

An adhesive composition and a polarizing plate were prepared in the same manner as in Example 4 except that a first photoinitiator was not used.

Comparative Example 5

An adhesive composition and a polarizing plate were prepared in the same manner as in Example 4 except that 1-hydroxycyclohexylphenylketone (Photoinitiator 3, Trade name: Omnirad 184, Manufacturer: IGM Resins Co., Ltd.), a ketone-based photoinitiator, was used as a first photoinitiator instead of 2,2-dimethoxy-2-phenylacetophenone.

Comparative Example 6

An adhesive composition and a polarizing plate were prepared in the same manner as in Example 4 except that a mixture of 1-hydroxycyclohexylphenylketone and benzophenone (Photoinitiator 4, Trade name: Omnirad 500, Manufacturer: IGM Resins Co., Ltd.) was used as a first photoinitiator instead of 2,2-dimethoxy-2-phenylacetophenone.

Comparative Example 7

An adhesive composition and a polarizing plate were prepared in the same manner as in Example 1 except that the polyfunctional acrylate, 2,2-dimethoxy-2-phenylacetophenone (Photoinitiator 1), and diphenyl(2,4,6-trimethylbenzoyl)phosphine oxide (Photoinitiator 2) were not used and the mixture was diluted such that the solid content of the mixture would be 51.3 wt %.

Comparative Example 8

An adhesive composition and a polarizing plate were prepared in the same manner as in Example 2 except that the polyfunctional acrylate, 2,2-dimethoxy-2-phenylacetophenone, and diphenyl(2,4,6-trimethylbenzoyl)phosphine oxide were not used and the mixture was diluted such that the solid content of the mixture would be 31.4 wt %.

Comparative Example 9

An adhesive composition and a polarizing plate were prepared in the same manner as in Example 2 except that 3 parts by weight of the polyfunctional acrylate was blended, diphenyl(2,4,6-trimethylbenzoyl)phosphine oxide (Photoinitiator 2) was not used, and the mixture was diluted such that the solid content of the mixture would be 32.8 wt %.

Comparative Example 10

An adhesive composition and a polarizing plate were prepared in the same manner as in Example 1 except that 20 parts by weight of the polyfunctional acrylate was blended, diphenyl(2,4,6-trimethylbenzoyl)phosphine oxide (Photoinitiator 2) was not used, and the mixture was diluted such that the solid content of the mixture would be 57.3 wt %.

Comparative Example 11

An adhesive composition and a polarizing plate were prepared in the same manner as in Example 2 except that 20 parts by weight of the polyfunctional acrylate was blended and diphenyl(2,4,6-trimethylbenzoyl)phosphine oxide (Photoinitiator 2) was not used.

Comparative Example 12

An adhesive composition and a polarizing plate were prepared in the same manner as in Example 1 except that the acrylic copolymer B1 prepared in Preparation Example 3 was used instead of the acrylic copolymer A1 prepared in Preparation Example 1, diphenyl(2,4,6-trimethylbenzoyl)phosphine oxide was not used, and the mixture was diluted such that the solid content of the mixture would be 35.2 wt %.

Comparative Example 13

An adhesive composition and a polarizing plate were prepared in the same manner as in Example 4 except that the acrylic copolymer B2 prepared in Preparation Example 4 was used instead of the acrylic copolymer A2 prepared in Preparation Example 2, diphenyl(2,4,6-trimethylbenzoyl)phosphine oxide was not used, and the mixture was diluted such that the solid content of the mixture would be 35.1 wt %.

Comparative Example 14

An adhesive composition and a polarizing plate were prepared in the same manner as in Example 4 except that the acrylic copolymer B2 prepared in Preparation Example 4 was used instead of the acrylic copolymer A2 prepared in Preparation Example 2, diphenyl(2,4,6-trimethylbenzoyl)phosphine oxide was not used, and the mixture was diluted such that the solid content of the mixture would be 24.2 wt %.

The physical properties of the adhesive composition and the polarizing plate prepared in each of Examples 1 to 6 and Comparative Examples 1 to 14 were measured, and the measurement results are shown in Table 2 to Table 4 below.

Method for Measuring Physical Properties

1. Coating Solid Content (Unit: %)

Coating solid was measured by the following method.

First, the weight (A) of an aluminum dish was measured. Then, about 0.3 to 0.5 g (weight of a specimen before drying: S) of the adhesive composition manufactured in each of Examples or Comparative Examples was collected and placed in the weighed aluminum dish. At this time, the weight B (A+S) of the specimen before drying including the weight of the aluminum dish was measured. Then, a small amount of ethyl acetate solution (0.5 wt % polymerization inhibitor concentration) in which a polymerization inhibitor (hydroquinone) was dissolved was added to the adhesive composition using a pipette, and then dried in an oven at 150° C. for about 30 minutes to remove a solvent. Thereafter, the dried specimen was cooled at room temperature for 15 minutes to 30 minutes, and then the weight C of the specimen after drying including the weight A of the aluminum dish was measured. The coating solid content was calculated according to Equation (3) below:

$$\text{Coating solid content (\%)} = \{(C-A)/(B-A)\} \times 100 \quad \text{Equation (3);}$$

In Equation (3), A is the weight (unit: g) of the aluminum dish, and C is the weight (unit:g) of the sample after drying including the weight A of the aluminum dish. B is the weight (unit:g) of the sample before drying including the weight A of the aluminum dish.

2. Coating Viscosity (Unit: cP)

The coating viscosity of each of the adhesive compositions was evaluated according to the following procedure using a measurement device (Brookfield digital viscometer (RV DV2T)).

220 mL of the adhesive composition was placed into a 250 mL PE bottle, and then the lid of the bottle was closed and tightly sealed with parafilm or the like to prevent a solvent from being volatilized. Thereafter, the adhesive composition was left under the constant temperature/humidity (23° C., 50% relative humidity) conditions to remove air bubbles. Then, the seal and the lid were removed. Thereafter, a spindle was placed in the adhesive composition at an angle such that air bubbles were not generated, and the spindle was connected to a viscometer and then adjusted such that the liquid level of the adhesive composition would fit the groove of the spindle. Thereafter, viscosity was measured under an rpm condition in which the torque was 20%(±1%).

3. Coating Properties

The adhesive composition prepared in each of Examples and Comparative Examples was coated on the polyethylene terephthalate film, and the state of the coating layer was observed with the naked eye and evaluated according to the following criteria.

<Coating Properties Evaluation Criteria>

○: Air bubbles, stripes, and the like on the coating layer are not visually confirmed.

X: Air bubbles and/or stripes on the coating layer are noticeably confirmed.

4. Push Distance (Creep, Unit: μm)

The polarizing plate manufactured in each of Examples and Comparative Examples were cut to a size of 10 mm in width and 10 mm in length to prepare a specimen. Thereafter, the release PET film attached to the adhesive layer was peeled off, and the polarizing plate was attached to an alkali-free glass using a 2 kg roller in accordance with JIS Z 0237 regulation to prepare a specimen for measurement. After that, the specimen for measurement was stored for 1 day and for 4 days, respectively, under the constant temperature/humidity conditions (23° C., 50% R. H.). Using a texture analyzer (TA, manufactured by Stable Micro Systems, UK), each push distance was measured. Specifically, the push distance was obtained by measuring a distance (unit: μm), the distance a polarizing plate is pushed from a glass substrate when a polarizing plate of the specimen for measurement was stretched for 1,000 seconds with a load of 1,000 g.

5. Adhesion Force (Unit: Gf/25 mm)

The polarizing plate manufactured in each of Examples and Comparative Examples was stored for 1 day and for 4 days, respectively, under the constant temperature/humidity conditions (23° C., 50% R. H.), and then was cut to a size of 25 mm in width and 100 mm in length to prepare a specimen. Thereafter, the release PET film attached to the adhesive layer was peeled off, and the polarizing plate was attached to an alkali-free glass using a 2 kg roller in accordance with JIS Z 0237 regulation to prepare a specimen for measurement.

The specimen for measurement was stored for 4 hours under the constant temperature/humidity conditions (23° C., 50% R. H.). Thereafter, using a texture analyzer (TA, manufactured by Stable Micro Systems, UK), a force required to completely separate a polarizing plate from a glass substrate by pulling the polarizing plate at a peeling rate of 300 mm/min and a peeling angle of 180° was measured to measure adhesion force (unit: gf/25 mm).

6. Rework Force (Unit: Gf/25 mm) and Rework Properties

The polarizing plate manufactured in each of Examples and Comparative Examples was stored for 1 day and for 4 days, respectively, under the constant temperature/humidity conditions (23° C., 50% R. H.), and then was cut to a size of 25 mm in width and 100 mm in length to prepare a specimen. Thereafter, the release PET film attached to the adhesive layer was peeled off, and the polarizing plate was attached to an alkali-free glass using a 2 kg roller in accordance with JIS Z 0237 regulation to prepare a specimen for measurement.

Thereafter, the specimen for measurement was stored for 1 hour at 80° C., and then was stored for 1 hour under the constant temperature/humidity conditions (23° C., 50% R. H.). Thereafter, using a texture analyzer (TA, manufactured by Stable Micro Systems, UK), a force required to completely separate a polarizing plate from a glass substrate by pulling the polarizing plate at a peeling rate of 300 mm/min and a peeling angle of 180° was measured to measure rework force (unit: gf/25 mm).

In addition, the rework properties were evaluated according to the following criteria after rework.

<Evaluation Criteria>

○: Rework force is less than 1,500 gf/25 mm, and there is no adhesive layer remaining on a glass substrate after rework.

Δ: Rework force is 1,500 gf/25 mm to less than 2,500 gf/25 mm, or there is a residue of an adhesive layer on a glass substrate after rework and the area of the residue is 5% or less.

X: Rework force is 2,500 gf/25 mm or greater, or there is a residue of an adhesive layer on a glass substrate after rework and the area of the residue is greater than 5%.

7. Durability Evaluation

The polarizing plate manufactured in each of Examples and Comparative Examples was cut to a size of 180 mm×250 mm (length×width) to prepare a sample, and the sample was attached on a 19-inch commercial panel using a laminator. Thereafter, the panel was pressed in an autoclave (50° C. and 5 atmospheric pressure) for about 20 minutes, and then stored for 24 hours under the constant temperature/humidity conditions (23° C., 50% R. H.) to produce a specimen for measurement.

The moisture and heat resistance durability of the produced specimens for measurement was evaluated by leaving the specimens for 500 hours at a temperature of 60° C. and a relative humidity of 90% R.H., and then observing the occurrence of bubbles or peeling.

Meanwhile, the heat resistant durability thereof was evaluated by leaving the specimens for 500 hours at a temperature of 80° C., 100° C., and 110° C., respectively, and then observing the occurrence of bubbles or peeling.

<Evaluation Criteria>

○: No bubbles and peeling

Δ: Some bubbles and/or peeling

X: A lot of bubbles and/or peeling

TABLE 2

|  |  | Example 1 | Example 2 | Example 3 | Example 4 | Example 5 | Example 6 |
|---|---|---|---|---|---|---|---|
| Composition (parts by weight) | Acrylic copolymer | A1<br>100 | A2<br>100 | A2<br>100 | A2<br>100 | A2<br>100 | A2<br>100 |
|  | Polyfunctional acrylate | 15 | 8 | 5 | 15 | 15 | 20 |
|  | Photoinitiator 1 | 1.5 | 1.5 | 1.5 | 1.5 | 1.5 | 1.5 |
|  | Photoinitiator 2 | 0.35 | 0.1 | 0.2 | 0.5 | 0.7 | 0.2 |
|  | Polyfunctional crosslinking agent | 0.2 | 0.2 | 0.2 | 0.2 | 0.2 | 0.2 |
|  | Silane coupling agent | 0.2 | 0.2 | 0.2 | 0.2 | 0.2 | 0.2 |
| Solid content (wt %) |  | 57.2 | 35.0 | 35.1 | 35.2 | 35.2 | 35.1 |
| Coating viscosity (cP) |  | 1,920 | 1,890 | 1,980 | 1,750 | 1,750 | 1,690 |
| Coating properties |  | ○ | ○ | ○ | ○ | ○ | ○ |
| Creep (um) | After 1 day | 118 | 182 | 237 | 114 | 112 | 103 |
|  | After 4 days | 116 | 173 | 227 | 114 | 112 | 103 |
| Adhesion (gf/25 mm) | After 1 day | 402 | 300 | 368 | 259 | 235 | 199 |
|  | After 4 days | 379 | 287 | 347 | 246 | 234 | 194 |
| Rework force (gf/25 mm) | After 1 day | 1030 | 870 | 1020 | 910 | 913 | 402 |
|  | After 4 days | 1055 | 829 | 970 | 867 | 893 | 396 |
| Rework properties | After 1 day | ○ | ○ | ○ | ○ | ○ | ○ |
|  | After 4 days | ○ | ○ | ○ | ○ | ○ | ○ |
| Durability | Moisture and heat resistance | ○ | ○ | ○ | ○ | Δ | Δ |
|  | Heat resistance (80° C.) | ○ | ○ | ○ | ○ | ○ | ○ |
|  | Heat resistance (100° C.) | ○ | ○ | ○ | ○ | ○ | Δ |
|  | Heat resistance (110° C.) | ○ | ○ | ○ | ○ | Δ | Δ |

TABLE 3

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Composition (parts by weight) | Acrylic copolymer | A1<br>100 | A2<br>100 | A2<br>100 | A2<br>100 | A2<br>100 | A2<br>100 | A1<br>100 |
|  | Polyfunctional acrylate | 15 | 8 | 5 | 15 | 15 | 15 | 0 |
|  | Photoinitiator 1 | 1.5 | 1.5 | 0 | 0 | 0 | 0 | 0 |
|  | Photoinitiator 2 | 0 | 0 | 0 | 0 | 0.5 | 0.5 | 0 |
|  | Photoinitiator 3 | 0 | 0 | 0 | 0 | 1.5 | 0 | 0 |
|  | Photoinitiator 4 | 0 | 0 | 0 | 0 | 0 | 1.5 | 0 |
|  | Polyfunctional Crosslinking agent | 0.2 | 0.2 | 0.2 | 0.2 | 0.2 | 0.2 | 0.2 |
|  | Silane coupling agent | 0.2 | 0.2 | 0.2 | 0.2 | 0.2 | 0.2 | 0.2 |
| Solid content (wt %) |  | 57.2 | 35.0 | 35.1 | 35.2 | 35.2 | 35.3 | 51.3 |
| Coating viscosity (cP) |  | 1,920 | 1,890 | 1,980 | 1,750 | 1,750 | 1,800 | 1,870 |
| Coating properties |  | ○ | ○ | ○ | ○ | ○ | ○ | ○ |
| Creep (um) | After 1 day | 123 | 193 | 255 | 128 | 120 | 123 | 373 |
|  | After 4 days | 118 | 176 | 236 | 122 | 117 | 119 | 361 |
| Adhesion (gf/25 mm) | After 1 day | 470 | 303 | 383 | 380 | 307 | 332 | 556 |
|  | After 4 days | 442 | 279 | 348 | 354 | 289 | 311 | 451 |
| Rework force (gf/25 mm) | After 1 day | 1,340 | 920 | 1,070 | 1,020 | 954 | 975 | 1,452 |
|  | After 4 days | 1,232 | 873 | 1,011 | 993 | 929 | 940 | 1,240 |
| Rework properties | After 1 day | ○ | ○ | ○ | ○ | ○ | ○ | ○ |
|  | After 4 days | ○ | ○ | ○ | ○ | ○ | ○ | ○ |
| Durability | Moisture and heat resistance | ○ | ○ | ○ | ○ | ○ | ○ | ○ |
|  | Heat resistance (80° C.) | ○ | ○ | ○ | ○ | ○ | ○ | ○ |
|  | Heat resistance (100° C.) | ○ | ○ | ○ | ○ | ○ | ○ | X |
|  | Heat resistance (110° C.) | X | X | X | X | X | X | X |

TABLE 4

| | | Comparative Example 8 | Comparative Example 9 | Comparative Example 10 | Comparative Example 11 | Comparative Example 12 | Comparative Example 13 | Comparative Example 14 |
|---|---|---|---|---|---|---|---|---|
| Composition (parts by weight) | Acrylic copolymer | A2 100 | A2 100 | A1 100 | A2 100 | B1 100 | B2 100 | B2 100 |
| | Polyfunctional acrylate | 0 | 3 | 20 | 20 | 15 | 15 | 15 |
| | Photoinitiator 1 | 0 | 1.5 | 1.5 | 1.5 | 1.5 | 1.5 | 1.5 |
| | Photoinitiator 2 | 0 | 0 | 0 | 0 | 0 | 0 | 0 |
| | Photoinitiator 3 | 0 | 0 | 0 | 0 | 0 | 0 | 0 |
| | Photoinitiator 4 | 0 | 0 | 0 | 0 | 0 | 0 | 0 |
| | Polyfunctional crosslinking agent | 0.2 | 0.2 | 0.2 | 0.2 | 0.2 | 0.2 | 0.2 |
| | Silane coupling agent | 0.2 | 0.2 | 0.2 | 0.2 | 0.2 | 0.2 | 0.2 |
| Solid content (wt %) | | 31.4 | 32.8 | 57.3 | 35.1 | 35.2 | 35.1 | 24.2 |
| Coating viscosity (cP) | | 1,810 | 1,840 | 1,720 | 1,690 | 1,930 | 12,300 | 1,730 |
| Coating properties | | ○ | ○ | ○ | ○ | ○ | X | ○ |
| Creep (um) | After 1 day | 349 | 294 | 113 | 105 | 172 | Cannot evaluate | 152 |
| | After 4 days | 342 | 280 | 111 | 104 | 150 | | 135 |
| Adhesion (gf/25 mm) | After 1 day | 472 | 407 | 294 | 198 | 832 | | 732 |
| | After 4 days | 422 | 367 | 287 | 196 | 692 | | 621 |
| Rework force (gf/25 mm) | After 1 day | 1,250 | 1,120 | 483 | 411 | 2,860 | | 2210 |
| | After 4 days | 1,154 | 1,046 | 473 | 395 | 1,380 | | 1120 |
| Rework properties | After 1 day | ○ | ○ | ○ | ○ | X | | Δ |
| | After 4 days | ○ | ○ | ○ | ○ | ○ | | ○ |
| Durability | Moisture and heat resistance | ○ | ○ | Δ | Δ | ○ | | ○ |
| | Heat resistance (80° C.) | ○ | ○ | ○ | ○ | ○ | | ○ |
| | Heat resistance (100° C.) | X | Δ | Δ | Δ | ○ | | ○ |
| | Heat resistance (110° C.) | X | X | X | X | X | | X |

As shown in [Table 2] above, the adhesive composition of each of Examples 1 to 6 showed viscosity properties of 2,000 cP or less even when the solid content was high. In addition, the rework properties of an adhesive layer were excellent, and there was not much change in the physical properties of the adhesive layer over time. In addition, the adhesive compositions all showed excellent durability under high temperature/high humidity conditions and high temperature conditions of 80° C., 100° C., and 110° C. Among them, as in Examples 1 to 4, when the content of the polyfunctional acrylate was 5 to 15 parts by weight and the content of the second photoinitiator satisfied 0.1 to 0.5 parts by weight, durability was found to be particularly excellent.

In comparison, as shown in [Table 3] and [Table 4] above, when the adhesive compositions of Comparative Examples 1 to 12 and 14 which do not satisfy the composition of the present invention were used, the durability thereof under the high temperature condition of 110° C. was poor.

Specifically, in the case of Comparative Examples 1 to 4 and 7 to 10, and 12 in which only one type of a photoinitiator was used and in the case of Comparative Examples 5 and 6 in which a combination of photoinitiators different from the combination of photoinitiators of the present invention was used, the durability was poor under the high temperature condition of 110° C. Furthermore, in the case of Comparative Examples 7 and 8 in which a polyfunctional acrylate was not used, durability under the high temperature conditions of 100° C. and 110° C. was poor.

The invention claimed is:

1. An acrylic adhesive composition comprising:
an acrylic copolymer formed by polymerizing a monomer mixture including a monomer represented by [Formula 1] below, a (meth)acrylic monomer having a crosslinkable functional group, and an alkyl (meth)acrylate-based monomer, and having a branched polymer structure;
a polyfunctional acrylate having two or more radically polymerizable functional groups;
a first photoinitiator; and
a second photoinitiator,
wherein the first photoinitiator is an acetophenone-based photoinitiator, and the second photoinitiator is a phosphine oxide-based photoinitiator:

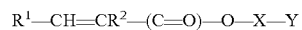

$$R^1-CH=CR^2-(C=O)-O-X-Y \qquad \text{[Formula 1]}$$

wherein, $R^1$ is hydrogen, a C1-C6 alkyl group, or a C2-C6 alkenyl group, $R^2$ is hydrogen or a C1-C10 alkyl group, X is a single bond, a C1-C10 alkylene group, a C2-C10 alkenylene group, ether, ester, or a combination thereof, and Y is a vinyl group, an allyl group, or a C3-C10 cycloalkenyl group.

2. The acrylic adhesive composition of claim 1, wherein the acrylic copolymer has a weight average molecular weight of 300,000 to 1,000,000 g/mol.

3. The acrylic adhesive composition of claim 1, wherein the monomer represented by [Formula 1] is one or more selected from the group consisting of allyl methacrylate, allyl acrylate, methallyl methacrylate, methallyl acrylate, 3-butenyl acrylate, but-3-enyl-2-methylprop-2-enoate, 2-allyloxyethyl acrylate, 2-allyloxyethyl methacrylate, 3-allyloxypropyl methacrylate, 3-allyloxypropyl acrylate, 2-allyloxyethoxyethyl methacrylate, 2-allyloxyethoxyethyl acrylate, cyclohex-2-enyl acrylate, cyclohex-2-en-1-yl 2-methylprop-2-enoate, and 3-vinylcyclohex-2-enyl acrylate.

4. The acrylic adhesive composition of claim 1, wherein the monomer mixture includes the monomer represented by [Formula 1] in an amount of 0.01 to 1 part by weight based on 100 parts by weight of the monomer mixture.

5. The acrylic adhesive composition of claim 1, wherein the monomer mixture includes:
   84 parts by weight to 99.89 parts by weight based on 100 parts by weight of the monomer mixture of the alkyl (meth)acrylate-based monomer;
   0.1 to 15 parts by weight based on 100 parts by weight of the monomer mixture of the (meth)acrylic monomer having a crosslinkable functional group; and
   0.01 to 1 part by weight based on 100 parts by weight of the monomer mixture of the monomer represented by [Formula 1].

6. The acrylic adhesive composition of claim 1, wherein the polyfunctional acrylate is included in an amount of 5 to 15 parts by weight based on 100 parts by weight of the acrylic copolymer.

7. The acrylic adhesive composition of claim 1, wherein the first photoinitiator is selected from the group consisting of acetophenone, dimethylamino acetophenone, 2,2-dimethoxy-2-phenylacetophenone, and 2,2-diethoxy-2-phenylacetophenone.

8. The acrylic adhesive composition of claim 1, wherein the second photoinitiator is diphenyl(2,4,6-trimethylbenzoyl)phosphine oxide.

9. The acrylic adhesive composition of claim 1, wherein the first photoinitiator is included in an amount of 1.0 to 5.0 parts by weight based on 100 parts by weight of the acrylic copolymer, and the second photoinitiator is included in an amount of 0.01 to 0.5 parts by weight based on 100 parts by weight of the acrylic copolymer.

10. The acrylic adhesive composition of claim 1, wherein the acrylic adhesive composition has a solid content of 35 wt % or greater, and a viscosity of 500 cP to 2,000 cP at 23° C.

11. The acrylic adhesive composition of claim 1, wherein the acrylic adhesive composition further comprises a polyfunctional crosslinking agent.

12. The acrylic adhesive composition of claim 11, wherein the polyfunctional crosslinking agent is an isocyanate-based crosslinking agent.

13. The acrylic adhesive composition of claim 11, wherein the polyfunctional crosslinking agent is included in an amount of 0.01 to 5 parts by weight based on 100 parts by weight of the acrylic copolymer.

14. A polarizing plate comprising:
   a polarizing film; and
   an adhesive layer formed on one surface or both surfaces of the polarizing film and including a cured product of the acrylic adhesive composition of claim 1.

15. A display device comprising the polarizing plate of claim 14.

16. The acrylic adhesive composition of claim 1, wherein the acrylic adhesive composition has a solid content of 35 wt % to 60 wt %.

17. The acrylic adhesive composition of claim 1, further comprising a silane coupling agent.

* * * * *